United States Patent Office 3,207,623
Patented Sept. 21, 1965

3,207,623
SIZED GLASS FIBER
Alfred Marzocchi, Cumberland, and Nicholas S. Janetos, Providence, R.I., assignors to Owens-Corning Fiberglas Corporation, a corporation of Delaware
No Drawing. Filed July 25, 1960, Ser. No. 45,228
4 Claims. (Cl. 117—126)

This invention relates to siliceous fibers and structures formed thereof and more particularly to glass fibers provided with a surface treatment which promotes a stronger bonding relationship between the glass fiber surfaces and synthetic organic polymeric materials which are employed in combinations with the glass fibers in the manufacture of fiber reinforced plastics, laminates, coated fabrics, and the like.

For purposes of description of the invention, reference will be made to the treatment and use of glass fibers but it will be understood that the concepts of this invention will be applicable to others of the siliceous fibers drawn from a molten bath and having the characteristics of glass fibers from the standpoint of strength and inertness and from the standpoint of the physical and chemical characteristics of the fibers which raise the problems of anchorage to resinous systems.

A great number of uses have been developed for glass fibers. One of the more important of the applications, based upon the exceptionally high strength characteristics of the glass fibers, has been as a reinforcement or strengthening agent for synthetic resinous polymers or elastomers in the manufacture of plastics, laminates, coated fabrics and the like. It has been found that unless a strong bonding relationship is capable of being established and retained between the glass fiber surfaces and the organic polymeric material, the contribution of strength by the glass fibers is considerably less than could otherwise be realized. Thus, a considerable amount of research and development has been expended in maximizing the bonding relationship between the glass fiber surfaces and the organic resinous or other organic polymeric materials.

In this respect, glass and the like synthetically formed siliceous fibers are substantially unlike natural fibers in that the latter offer the possibilities of either a strong physical bond or a strong chemical bond or both with resinous materials whereas it is difficult to establish a strong physical or chemical bond with glass fibers. For example, most natural fibers and some of the siliceous fibers, such as asbestos, are characterized by surface roughness or high porosity sufficient to enable resinous materials physically to acquire a strong hold onto the fibers. On the other hand, glass fibers are non-porous and have perfectly smooth surfaces such that there is nothing onto which the resinous materials can grab.

Most natural or synthetic resinous fibers contain groupings on the surfaces which are more highly receptive to resinous materials than to water such that an anchorage can be established between the resinous materials and the organic or natural fiber surfaces which is not disturbed by water. On the other hand, the groupings that predominate on the glass fiber surfaces are hydrophilic in character such that only a weak bond can be established in the first instance between the synthetic resinous or polymeric materials and the glass fiber surfaces. Such bond as is capable of being initially established is substantially reduced by a film of water that preferentially forms between the resinous material and the glass fiber surfaces in the presence of moisture or high humidity. Thus fuller utilization of the strength and other desirable properties of the glass fibers in combinations with organic polymeric or resinous materials is dependent on increasing the bonding relationship between the glass fiber surfaces and the organic polymeric materials with which the glass fibers are combined in the manufacture of glass fiber reinforced plastics, laminates and coated fabrics, and the ability to retain the desired bonding relationship under moist or high humidity conditions.

Over the past several years, research and development has produced a number of systems which are capable of use to render the glass fiber surfaces more receptive to resinous and other organic polymeric materials and to enhance the bonding relationship between the glass fiber surfaces and such resinous or polymeric materials. For the most part, such systems have been based upon the operation of an anchoring agent having at least one group which is capable of strong and relatively permanent attachment to the surfaces of the glass fibers and one or more other groupings to which the resinous or polymeric materials are capable of attachment whereby the anchoring agent is able to tie the resinous or polymeric materials onto the glass fiber surfaces.

In U.S. Patent No. 2,552,910, Dr. Steinman illustrated one of the systems wherein use is made of an anchoring agent in the form of a chromic (Werner) complex compound having a carboxylato group coordinated with the trivalent nuclear chromium atom in which the carboxylato group is of less than six carbon atoms and contains a highly functional group. The chromic atom of the complex is believed capable of strong attachment to the glass fiber surfaces while the functional group of the short chained carboxylato radical is capable of effecting strong attachment with resinous or polymeric materials. Dr. Steinman, in U.S. Patent No. 2,563,288, illustrated another system wherein use was made of an anchoring agent in the form of a silane, its hydrolysis products or its polymerization products having at least one of the organic groups attached to the silicon atom which contained less than seven carbon atoms and was formed with ethylenic unsaturation. The theory of operation is believe to reside in the ability of the silicon atom strongly to become attached to the silicon oxide groupings present on the surfaces of the glass fibers while the ethylenic group provides means for attachment of resinous or polymeric materials preferably formed by addition polymerization through ethylenic or acetylenic groupings in the monomer of which the polymer is formed.

The effectiveness of an anchoring agent depends greatly upon the availability of the glass fiber surfaces for attachment. Thus, where a size has previously been applied to the glass fiber surfaces in forming to enable the fibers to be processed into strands, yarns and fabrics without destruction of the fibers by mutual abrasion, it has been necessary to remove the size from the glass fiber surfaces before application of the anchoring agent. Objections are to be found in the application of the anchoring agent directly to the glass fibers in forming because the anchoring agent is, in itself, substantially incapable of the lubricity and bonding required for processing the fibers into strands or fabrics. The anchoring agent is incapable further of proper protection of the glass fiber surfaces to prevent destruction by mutual abrasion. Thus, in commercial practice, a rather elaborate, time consuming and expensive operation is employed wherein the glass fibers are sized in forming with a conventional size embodying a desired balance between lubricating and bonding. The sized glass fibers are processed into stands and woven into fabrics. The fabrics are washed or heat treated to remove the size and then the cleaned glass fibers are coated with the anchoring agent. Such multiple operations not only make the process expensive and time consuming but it has been found that the glass fibers are damaged to some extent during handling, while in an unprotected state, i.e., after the size has been removed.

Numerous attempts have been made to adapt a system wherein the anchoring agent can be incorporated as a component in the size composition thereby to produce a size which has the desired processing characteristics for fabrication of the fibers into yarns and fabrics and the desired preformance characteristics for rendering the sized fibers more receptive to resinous or organic polymeric materials without the necessity to remove the size originally applied. While such combinations provide improvements by comparison with size compositions without anchoring agents, full benefit of the anchoring agent is incapable of being achieved because of the dilution of the anchoring agent in the size composition such that only a small proportion of that present in the applied coating is effective for the intended purpose.

One method of overcoming difficulties encountered in preparation of glass fibers for combination with resinous materials has been the use of size compositions for glass fibers embodying an anchoring agent and an epoxy resin as a film forming component. Such systems are described in the copending application of Collier, Ser. No. 474,007, filed December 8, 1954, now abandoned, and entitled, "Treated Glass Fibers and Method for Treating Glass Fibers To Improve the Bonding Relation With Epoxy Resins." While the combinations of anchoring agents and epoxy resins as illustrated in the copending application give good results, it is desirable that a still better size be formulated whereby further improvements might be achieved in the processing characteristics of the glass fibers and in their utilization as a reinforcement for resinous materials in the manufacture of plastics and laminates.

Some measure of success has been secured in the formulation of glass fiber size compositions containing anchoring agents of the type described which are compatible with certain types of resinous materials. In most instances, such size compositions have been found to be specific in that they find use in conjunction with a specific limiting resin with which the glass fibers are to be combined. It would be beneficial if a size composition were available for use with glass fibers which would operate not only to accomplish the effects desired of a size but which would also be compatible with a number of resinous materials used in combinations therewith in the manufacture of glass fiber reinforced plastics, laminates and coated fabrics, including such resinous materials as the epoxy resins, modified polyester resins, polyurethane resins and the like condensation polymerization resins.

It is an object of this invention to produce and to provide a method for producing glass fibers having a size on the surfaces thereof in the form of a thin continuous coating which is capable of the combination of functions of a size for protecting the glass fiber surfaces and bonding the fibers in strand or yarn formation while, at the same time, rendering the fibers highly receptive to organic polymeric or resinous materials which are employed in combination with glass fibers in the manufacture of resinous products.

It is a related object to produce a new and improved size composition containing an anchoring agent for use in treatment of glass fibers without dilution of the effectiveness of the anchoring agent for bonding the organic polymeric resinous materials with the glass fiber surfaces.

An important object is to provide a glass fiber size composition and glass fibers sized thereby wherein the size coating is compatible with resinous materials, especially epoxy type resinous materials, with which the glass fibers are combined in the manufacture of glass fiber reinforced resinous products.

In accordance with the practice of this invention, the glass fibers are treated, preferably in forming, to coat the surfaces with a size composition embodying one or more components having a molecular structure which provides film forming characteristics for protection of the glass fiber surfaces against destruction by forces of abrasion; which embodies lubrication for enabling relative movement between the fibers for processing into yarns and threads and for the fabrication of woven or non-woven fabrics therefrom; which contains radicals or groupings capable of strong and preferential attachment to the groupings predominating on the glass fiber surfaces; which contains other groupings which are effective to enable strong attachment to be achieved with organic polymeric or resinous materials with which the glass fibers are combined. Thus the thin coating present as a size on the glass fiber surfaces is capable of functioning simultaneously as a protective agent and as an anchoring agent to provide attachment to the glass fiber surfaces without dilution while, at the same time, the material is capable of functioning as a protective coating and as a receptive base for resinous materials subsequently to be applied in the fabrication of glass fiber reinforced plastics, laminates, coated fabrics and the like.

The concepts of this invention can perhaps best be described by reference to a specific formulation of a size composition adapted to be applied to the glass fibers in forming to improve the processing characteristics of glass fibers in strand, yarn, thread and fabric formation and simultaneously to improve the performance characteristics of the glass fibers when used in combination with resinous materials, especially of the epoxy or polyester types, in the fabrication of glass fiber reinforced resinous products and without the necessity of removing the size originally applied for replacing with a coating having, as its sole purpose, the improvement of the bonding relationship between the glass fiber surfaces and the resinous materials with which it is combined.

It should be understood, however, that the following example is given solely by way of illustration, and not by way of limitation, as will hereinafter be defined:

*Example 1*

|  | Percent by weight |
|---|---|
| Polyester resin | 3.0 |
| Gamma-amino propyl triethoxy silane | 0.3 |
| Toluene | 1.0 |
| Polyvinyl alcohol | 0.1 |
| Glass fiber lubricant | 0.1 |
| Gelatin | 0.1 |
| Polyvinyl pyrrolidone | 0.3 |
| Remainder, water. | |

In the above formulation, the polyester resin is a condensation reaction product of propylene glycol, succinic acid and phthalic anhydride to produce a saturated polyester resin having an excess of free hydroxyl groups. The glass fiber lubricant is a fatty acid condensate of lauric acid, ethylene oxide and a diamine such as ethylene diamine.

The polyester resinous component most suitable for producing size compositions embodying the concepts of this invention should contain a polar grouping such as a hydroxy, amino or amido group. It will be understood that while the polyester resin should be water dispersible and contain such polar groupings as hydroxy, amino or amido, it is also possible for the polyester resin to contain minor amounts of carboxylic acid groups with understanding that such carboxylic acid groupings should not exceed the other functional groups. In the practice of this invention, it is preferred to fabricate the polyester of saturated components such as saturated carboxylic acids and saturated polyols. The carboxylic acid useful in preparing the polyester resin may be selected from such acids as phthalic acid, isophthalic acid, citric acid, gluconic acid, succinic acid, tartaric acid and the like. The polyhydric alcohols may be selected from a large group of commercially available polyhydroxy compounds such as glycerol, erythritol, pentaerythritol, sorbitol, ethylene glycol, 1,2-propylene glycol and related polyethylene and ethylene glycols.

It is undesirable to make use of a saturated polyester or saturated alkyd resin having a high acid number in a size composition embodying the features of this invention. Such high number alkyd resins are sticky, unstable and difficult to handle. Instead, it is preferred to make use of a saturated polyester or alkyd resin having a high free hydroxyl content since such materials provide for easier emulsification in aqueous medium and for improved stabilization of the treating composition. The hydroxyl groups available in large quantities in the film forming component also enhance the interreaction with groupings available in the epoxy or polyester or other condensation reaction resins with which the treated glass fibers are combined to tie in the resin with the film forming component of the size composition coating the glass fiber surfaces. Use can also be made of a modified alkyd resin of high hydroxyl content such as CA-19456, marketed by Sherwin-Williams Company of Chicago, Illinois, and formed of the reaction products of castor oil, isophthalic anhydride and glycerol.

In the preferred practice of this invention it is desirable to make use of the saturated alkyd embodying one or more amides and the like polar groups. For this purpose, simple aliphatic primary, secondary or tertiary amines may be reacted into the polyester resin containing carboxyl groups to produce the amine salt or amide, depending upon the particular reaction conditions employed. Instead of using mono-amines of the aliphatic type, polyamines such as alkylene polyamines and polyalkylene polyamines may be reacted with the carboxyl containing alkyd or polyester resin. In addition to the use of aliphatic monoamines or alkylene polyamines, satisfactory results can be achieved when the polyester resin is modified with a heterocyclic amine of the type represented by 1,2-substituted imidazolines, tetrahydropyrimidines, pyridines and the like.

The aliphatic monoamines may be selected from such commercially available materials as N-propylamine, dimethylamine, butylamine, octadeceamine, N-soyaamine, N-dicocoamine and stearylamine.

The polyamines may be selected from such chemicals as hexamethylene diamine, ethylene diamine, 1,3-propylene diamine, lauryltrimethylene diamine, stearyltrimethylene diamine, diethylene triamine and tetraethylene pentamine. The 1,2-substituted imidazolines are well known and are discussed at length in the publication "The Chemistry of the 2-Imidazolines and Imidazolidines" by R. J. Ferni et al., 54 Chemical Reviews (1954), Wilson U.S. Patents 2,267,965 and 2,355,837, as well as U.S. Patent 2,865,817, the disclosures of which are incorporated herein by reference.

Typical 1,2-substituted imidazolines which may be used as modifiers for the polyester resins are listed below:

| Identification | 1,2-substituted imidazoline |
| --- | --- |
| A | 1-(2-aminoethyl)-2-heptadecenyl imidazoline. |
| B | 1-(2-hydroxyethyl)-2-heptadecenyl imidazoline. |
| C | 4-methyl-2-heptadecenyl imidazoline. |
| D | 1-[2-(2-aminoethyl)-aminoethyl]-2-heptadecenyl imidazoline. |
| E | 1-(2-aminoethyl)-2-tridecyl imidazoline. |
| F | 1-(2-aminoethyl)-2-undecyl imidazoline. |
| G | 1-(2-hydroxyethyl)-2-undecyl imidazoline. |
| H | 1-(2-hydroxyethyl)-2-tridecyl imidazoline. |
| I | 1-[2-(2-aminoethyl)-aminoethyl]-2-tridecyl imidazoline]. |
| J | 1-(2-aminoethyl)-2-pentadecyl imidazoline. |
| K | 1-(2-hydroxyethyl)-2-pentadecyl imidazoline. |
| L | 4-methyl-2-pentadecyl imidazoline. |
| M | 1-[2-(2-aminoethyl)-aminoethyl]-2-pentadecyl imidazoline. |
| N | 1-octyl-2-heptadecyl imidazoline. |
| O | 2-heptadecyl imidazoline. |
| P | 2-heptadecenyl imidazoline. |
| Q | 1-octadecenyl-2-methyl imidazoline. |
| R | bis amino [1-(2-aminoethyl)-2-heptadecenyl imidazoline]. |

A representative amide type polyester which can be employed either alone or in combination with a saturated polyester is marketed by the Quaker Chemical Company under the trade name "Quaker 1104" and "Quaker 1104P" and comprises the reaction product of 1,2-substituted imidazoline, such as 2-octadecenyl imidazoline with a modified alkyd formed by the condensation reaction of maleic anhydride, triethylene glycol and stearic acid.

The saturated alkyd resinous component, modified or unmodified, amidized or unamidized, can be employed in the size composition in an amount within the range of 2–15 percent by weight and preferably in an amount within the range of 3–8 percent by weight. When the alkyd resinous component is formed with an amidized alkyd, the amount should preferably be in the upper portion of the range such as within 4–10 percent by weight of the composition. When formed of a conventional saturated alkyd, the amount preferred is within the range of from 2–5 percent. When both are employed, the amidized alkyd may range from 4–10 percent by weight and the saturated alkyd may range from 2–5 percent by weight.

The organo silane component, represented in Example 1 as gamma-amino propyl triethoxy silane, may be a silane or its hydrolysis product or polymerization product. The organo silane is a difunctional component wherein one of the functional groups of the silane is capable of bonding with groupings present on the glass fiber surfaces while another group of the silane embodies a functional group for preferential attraction or reaction with the resinous material with which the glass fibers are to be combined. Thus the silane should contain at least one and preferably as many as three highly hydrolyzable groups such as a methoxy, ethoxy, propoxy or other short chained oxy group, a halogen or amino group attached directly to the silicon atom whereby the silicon oxide group formed upon hydrolysis is available for attachment to the glass fiber surfaces. At least one organic group which remains attached to the silicon atom should contain a functional group in an aliphatic group of less than 8 carbon atoms. The functional group may be selected of a hydroxyl, carboxyl, amino, alkoxy, keto, or an unsaturated ethylenic or acetylenic group. The following are representative of some of the more desirable organo silicon compounds which may be employed in the practice of this invention.

Gamma-amino propyl triethoxy silane

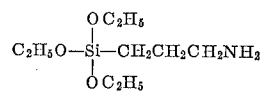

p-Amino phenyl trihydroxysilane

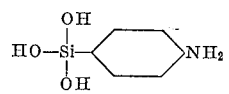

Amino ethyl triacetoxy silane $$(CH_3CH_2O)_3Si—CH_2CH_2NH_2$$

β-Carbethoxy ethyl triethoxy silane

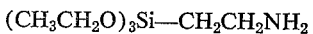

Anhydride $$(C_2H_5O)_3—Si$$

Triethoxy-6 phthalic anhydride silane

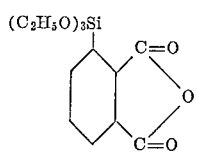

Vinyl triethoxy silane

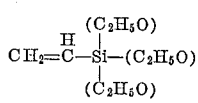

Epoxy triethoxy silane

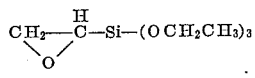

The preferred silane compounds have one polar group in the form of an aliphatic group which does not exceed 8 carbon atoms in chain length. Thus the compound, para-aminophenyl trihydroxy silane, has given outstanding results in the practice of this invention.

The organo silicon component may be present in the glass fiber composition in an amount corresponding to 0.1–1.0 percent by weight but its preferred to make use of an amount within the range of from 0.2–0.5 percent by weight of the composition.

While polyvinyl pyrrolidone is not essential to the size composition embodying the practice of this invention, its presence is preferred in the formulation to improve the hand and feel of the treated fibers and to improve the stability of the treating composition. Even greater improvements are observed when the polyvinyl pyrrolidone, modified polyester resin and difunctional organo silicon compound are formulated in combination with gelatin as an additional component. When either polyvinyl pyrrolidone and/or gelatin are used in the formulation of the size composition, it is desirable to formulate the coating composition with 0.1–1.0 percent by weight polyvinyl pyrrolidone and preferably 0.3–0.5 percent by weight, while the amount of gelatin may range from 0.1–1.0 percent by weight and preferably from 0.1–0.5 percent by weight.

The polyvinyl alcohol and glass fiber lubricant are preferred, though not essential, ingredients in glass fiber size compositions embodying the practice of this invention. Also optional are such additional compounds as a surface active and wetting agent and a polyamide suspensoid as will hereinafter be described.

Instead of polyvinyl alcohol, use can be made of other hydrophilic colloid such as a polyhydric alcohol polymer, as represented by polyethylene glycol or proteinaceous material such as starch, alginate and the like. When present, it is desirable to make use of polyvinyl alcohol or other hydrophilic colloid in an amount within the range of 0.05–0.4 percent by weight and preferably in an amount within the range of 0.1–0.2 percent by weight of the size composition.

As the glass fiber lubricant, it is desirable to make use of a fatty acid cationic amine such as the reaction product of a diamine, ethylene oxide and lauric acid, marketed by Nopco Chemical Company as "Nopcogen 16L," or a pelargonate amide solubilized with acetic acid, marketed by Arnold Hoffman Company as "RL185A," or tetraethylene pentamine which has been further reacted to contain five methallyl side chains as a direct substitution on the nitrogen groups, marketed by Arnold Hoffman Company as "RL222," or long chain fatty acid amine salts such as lauryl amine acetate, stearyl amine chloride and the like. An amount of glass fiber lubricant within the range of 0.05–0.3 percent by weight of the size composition may be employed but it is preferred to make use of the glass fiber lubricant component in an amount within the range of 0.1–0.3 percent by weight.

The wetting agent may be a non-ionic compound selected from such materials as ethoxylated alcohols, fatty acids and the like, such as nonyl phenol reacted with 5 mols of ethylene oxide. While non-ionic wetting agents are preferred, anionic or cationic type wetting agents or dispersing agents may be used. The wetting or surface active agent may be present in an amount ranging from 0.05 to 0.5 percent by weight of composition and preferably within the range of 0.1–0.2 percent by weight of the composition.

The following examples are given by way of further illustration of size compositions which may be employed in accordance with the concept of this invention in the treatment of glass fibers to improve their processing and performance characteristics.

*Example 2*

| | Percent by weight | |
|---|---|---|
| | Broad range | Narrow range |
| General formula: | | |
| Polyester resin | 2–15 | 3–8 |
| Organo silicon compound | 0.1–1.0 | 0.2–0.5 |
| Polyvinyl pyrrolidone | 0.1–1.0 | 0.3–0.5 |
| Gelatin | 0.1–1.0 | 0.1–0.5 |
| Polyvinyl alcohol | 0.05–0.4 | 0.1–0.2 |
| Wetting agent | 0.05–0.5 | 0.1–0.4 |
| Remainder water, plus a small amount of a solvent, such as toluene, when necessary for solubilization. | | |

*Example 3*

| | Percent by weight | |
|---|---|---|
| | Broad range | Narrow range |
| General formula: | | |
| Saturated polyester | 2–5 | 2–5 |
| Amidized polyester | 4–10 | 4–8 |
| Organo silicon compound | 0.1–1.0 | 0.2–0.5 |
| Polyvinyl pyrrolidone | 0.1–1.0 | 0.3–0.5 |
| Gelatin | 0.1–1.0 | 0.1–0.5 |
| Polyvinyl alcohol | 0.05–0.4 | 0.1–0.2 |
| Wetting agent | 0.05–0.5 | 0.1–0.4 |
| Remainder water, plus a small amount of a solvent, such as toluene, when necessary for solubilization. | | |

*Example 4*

|   | Percent by weight |
|---|---|
| Polyester Resin [1] | 8.0 |
| Gamma-aminopropyl triethoxy silane | 0.3 |
| Remainder, water. | |

[1] Formed from maleic anhydride, triethylene glycol and stearic acid amidized with 2-heptadecenyl imidazoline.

*Example 5*

|   | Percent by weight |
|---|---|
| Polyester of Example 4 | 8.0 |
| Gamma-aminopropyl triethoxy silane | 0.3 |
| Polyvinyl pyrrolidone | 0.5 |
| Remainder, water. | |

*Example 6*

|   | Percent by weight |
|---|---|
| Polyester resin [1] | 5.0 |
| Nonyl phenol Rx with 5 mols ETO | 0.1 |
| Polyvinyl alcohol | 0.05 |
| Gamma-aminopropyl triethoxy silane | 0.3 |
| Polyvinyl pyrrolidone | 0.5 |
| Remainder, water. | |

[1] Formed from castor oil and naphthalic anhydride (high hydroxyl content).

*Example 7*

|   | Percent by weight |
|---|---|
| Polyester resin of Example 4 | 1.0 |
| Polyester resin [1] | 4.5 |
| Polyvinyl alcohol | 0.1 |
| Gamma-aminopropyl triethoxy silane | 0.3 |
| Glycerol | 0.3 |
| Polyvinyl pyrrolidone | 1.5 |
| Fatty acid type textile lubricant | 0.3 |
| Remainder, water. | |

[1] Formed from propylene glycol, succinic acid and phthalic anhydride.

For a representative procedure in mixing the various materials, illustration will be made to the preparation of the formulation of Example 7 which contains all of the components of the previous examples and therefore illustrates the method of formulation. The polyester resin of Example 4 is diluted with about ten times its weight of water heated to a temperature of 120–140° F. and mildly agitated until dissolved. The fatty acid amine lubricant (Arnold Hoffman Company 185A), dissolved in 4 percent by weight of the water and 400 cc. of glacial acetic acid, is added slowly. The polyvinyl pyrrolidone is separately dissolved in two times its weight of water heated to 250° F. and agitated until a uniform solution is obtained. The polyester resin formed from propylene glycol, succinic acid and phthalic anhydride is introduced into a stainless steel steam jacketed kettle and heated to a temperature of about 150° F. The polyvinyl alcohol is added directly to the heated resin and then the solution of polyvinyl pyrrolidone is introduced. In a separate main tank, one-half of the water is introduced cold and acidified with 400 cc. of glacial acetic acid. The glycerine is added to the gamma-aminopropyl triethoxy silane and then added to the water with stirring to insure complete solution. The resin emulsion prepared in the steam jacketed kettle is then introduced into the water followed by the addition of the lubricant and the final mixture is adjusted to a pH of 4.5±0.5.

The size compositions are applied to the glass fibers in forming as by means of a conventional roller coater, pad coater, dip coat, spray or brush coat and the like. After application the fibers are gathered together into yarns or strands to form woven or non-woven fabrics which may be used in combination with the resinous material in the fabrication of glass fiber reinforced structures.

The size composition can be allowed to air dry but sometimes it is desirable to accelerate the coating and to advance the setting of the resinous metarials by the application of heat but ordinarily it is not necessary to go beyond temperatures of 350° F.

Another important concept of this invention resides in the further modification of size compositions of the type described to include a polyamide suspensoid as a component thereof. The polyamide suspensoid may broadly be defined as the condensation reaction of a polyamine with a dicarboxylic or polycarboxylic acid as more fully described in the copending application of Alfred Winsor Brown, Serial No. 863,095, filed December 31, 1959, wherein the polyamide is described as comprising a reaction product between a dimerized oleic acid and "Doumeen" to build up the molecular weight while providing occasional free amine groups in the polymer. The "Doumeen" is a monoalkyl substituted trimethylene diamine marketed by Armour Chemical Company and having the structural formula

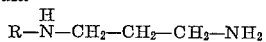

wherein R is a higher aliphatic group of at least 6 carbon atoms and preferably 12–18 carbon atoms in aliphatic arrangement. The polyamide suspensoid may be employed in the size composition in amounts ranging from 2–10 percent by weight and preferably from 2–5 percent by weight.

The following are further examples illustrating the concepts of this invention wherein the polyamide suspensoid is employed as a component in the treating composition:

*Example 8*

| | Percent by weight |
|---|---|
| Polyester resin [1] | 8.0 |
| Gamma-aminopropyl triethoxy silane | 0.3 |
| Polyamide suspensoid (General Mills A-000) | 5.0 |
| Remainder, water. | |

[1] Formed from propylene glycol, succinic acid and phthalic anhydride.

*Example 9*

| | Percent by weight |
|---|---|
| Polyester resin of Example 8 | 3.05 |
| Polyvinyl alcohol | 0.05 |
| Nonyl phenol Rx with 5 mols ETO | 0.1 |
| Gamma-aminopropyl triethoxy silane | 0.3 |
| Polyamide suspensoid of Example 8 | 5.0 |
| Fatty acid type textile lubricant | 0.15 |
| Remainder, water. | |

*Example 10*

| | Percent by weight |
|---|---|
| Polyester resin of Example 4 | 10 |
| Gamma-aminopropyl triethoxy silane | 0.3 |
| Polyamide suspensoid of Example 8 | 4.0 |
| Remainder, water. | |

Glass fibers sized with compositions embodying the features of this invention embody improved characteristics when subjected to standard processing steps such as drying, beaming, winding, twisting, plying and the like in strand yarn, thread and fabric formation. Not only are the processing characteristics of the glass fibers improved but their performance characteristics are improved when combined with epoxy or polyester resins in the manufacture of glass fiber reinforced plastics, laminates, coated fabrics or other structures. The polyester resinous component in the size coating remains compatible with the polyester or epoxy resins to be combined with the glass fibers with the result that no dilution results from the combination of the organo silicon anchoring agent in combination with the polyester resin in the size composition.

It will be understood that various changes may be made in the details of formulation and application without departing from the spirit of the invention, especially as defined in the following claims.

We claim:

1. Sized glass fibers wherein glass fibers are sized to provide a thin coating on the glass fiber surfaces consisting of an organo silicon compound in the form of a silane, its hydrolysis product and its polymerization product wherein the silane is formed with from 1–3 hydrolyzable groups and an organic group attached to the silicon atom containing a functional group, a water dispersible polyvinyl pyrrolidone, gelatin, and a water dispersible polyester resin selected from the group consisting of a saturated polyester resin, and a modified polyester resin, said polyester resin having a plurality of polar groups selected from the group consisting of hydroxy, amino and amido groups.

2. Sized glass fibers as claimed in claim 1 in which the components are present in the ratio of 2–15 parts by weight of the polyester resin, 0.1–1.0 parts by weight of the organo silicon compound, 0.1–1.0 parts by weight of gelatin and 0.1–1.0 parts by weight of the polyvinyl pyrrolidone.

3. Sized glass fibers as claimed in claim 1 in which the polyester resin in a saturated polyester resin and in which the materials are present in the ratio of 3–8 parts by weight of the polyester resin, 0.1–0.5 parts by weight of gelatin, 0.2–0.5 parts by weight of the organo silicon compound, and 0.3–0.5 parts by weight of the polyvinyl pyrrolidone.

4. Sized glass fibers comprising glass fibers having a size present as a thin coating on the glass fiber surfaces formed of a composition consisting of 0.1–1.0 parts by weight of an organo silicon compound in the form of a silane, its hydrolysis product and its polymerization product wherein the silane is formed with from 1–3 hydrolyzable groups and an organo group attached to the silicon atom containing a functional group, 1–10 parts by weight of a water dispersible polyamide resin, 2–15 parts by weight of a water dispersible polyester resin, 0.1–1.0 parts by weight of polyvinyl pyrrolidone and 0.1–1.0 parts by weight of gelatin, and wherein the water dispersible polyester resin is selected from the group consisting of a saturated polyester resin, and a modified polyester resin, said polyester resin having a plurality of polar groups selected from the group consisting of hydroxyl, amino and amido groups.

(References on following page)

References Cited by the Examiner

UNITED STATES PATENTS

| | | | |
|---|---|---|---|
| 2,468,086 | 4/49 | Latham et al. | 117—126 |
| 2,563,289 | 8/51 | Steinman | 117—126 |
| 2,673,824 | 3/54 | Biefeld et al. | 117—126 |
| 2,688,007 | 8/54 | Steinman | 117—126 |
| 2,723,208 | 11/55 | Morrison | 117—126 |
| 2,763,573 | 9/56 | Biefeld | 117—126 |
| 2,780,909 | 2/57 | Biefeld et al. | 117—126 |
| 2,801,189 | 7/57 | Collier | 117—126 |
| 2,813,844 | 11/57 | Werner et al. | 117—126 |
| 2,881,184 | 4/59 | Pike | 117—126 |
| 2,931,739 | 4/60 | Marzocchi et al. | 117—126 |
| 2,951,772 | 9/60 | Marzocchi et al. | 117—126 |
| 2,958,114 | 11/60 | Marzocchi et al. | 117—126 |
| 2,958,614 | 11/60 | Perry | 117—126 |
| 2,983,700 | 5/61 | Rohm | 117—126 |

RICHARD D. NEVIUS, *Primary Examiner.*